H. C. WHITE.
TRACTOR TRUCK MECHANISM.
APPLICATION FILED JUNE 13, 1917.

1,304,428.

Patented May 20, 1919.
2 SHEETS—SHEET 1.

WITNESSES:
Charles Rickles
Julius C. Benesch

INVENTOR
Harold C. White
BY Strong & Townsend
ATTORNEYS

H. C. WHITE.
TRACTOR TRUCK MECHANISM.
APPLICATION FILED JUNE 13, 1917.
1,304,428.
Patented May 20, 1919.
2 SHEETS—SHEET 2.
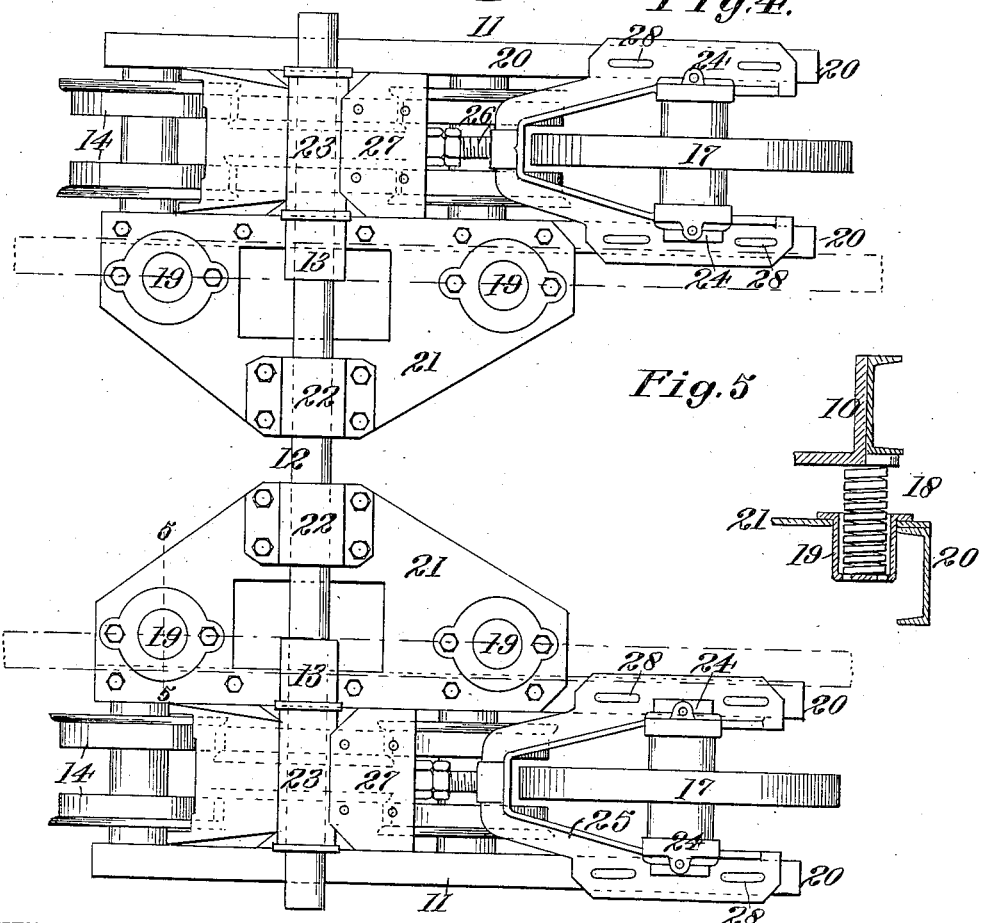
WITNESSES:
Charles Rickles
Julius C. Benesch
INVENTOR
Harold C. White
BY Strong & Townsend
ATTORNEYS

UNITED STATES PATENT OFFICE.

HAROLD C. WHITE, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR-TRUCK MECHANISM.

1,304,428.            Specification of Letters Patent.       Patented May 20, 1919.

Application filed June 13, 1917. Serial No. 174,507.

*To all whom it may concern:*

Be it known that I, HAROLD C. WHITE, a citizen of the United States, residing at Stockton, in the county of San Joaquin and State of California, have invented new and useful Improvements in Tractor - Truck Mechanism, of which the following is a specification.

This invention relates to tractor truck mechanism of the self-laying track type, and has for its object to provide simplified and improved roller truck mechanism and mounting therefor.

In carrying out this invention I employ a roller truck frame fitted with a series of rollers bearing upon the ground run of an endless flexible track and pivoted intermediate its ends upon a transverse shaft or axle supported on the main frame, the forward end of the truck frame carrying the front idler wheel for the chain track. The sprocket driving wheel for the chain track is journaled upon the main frame at the rear thereof and the driving and idler wheels both have the lower portions of their peripheries normally elevated above the ground run of the track whereby the roller truck mechanism constitutes the sole support for the main frame. In order to cushion the main frame and keep the roller truck frame in proper position I provide springs on the opposite sides of the pivot between the truck frame and the main frame and employ a novel mounting for the same to permit springs of increased length to be used. This arrangement provides an oscillating roller truck frame wherein the movements are not unduly restricted by the chain as in the case of centrally pivoted trucks where the front idler wheel is mounted upon the main frame. Here the idler wheel and front portion of the track chain move with the roller truck frame and the upward movement of one end of the roller truck frame produces the slack in the chain necessary to permit the opposite end to move downwardly. Other features of novelty are present in the construction as will hereinafter appear.

One form which my invention may assume is exemplified in the following description and illustrated in the accompanying drawings, in which—

Fig. 3 shows a side elevation of the roller truck mechanism with the chain track removed.

Fig. 4 shows a plan view of the same.

Fig. 5 shows a detail in section of one of the supporting springs and mounting therefor.

Figure 1:
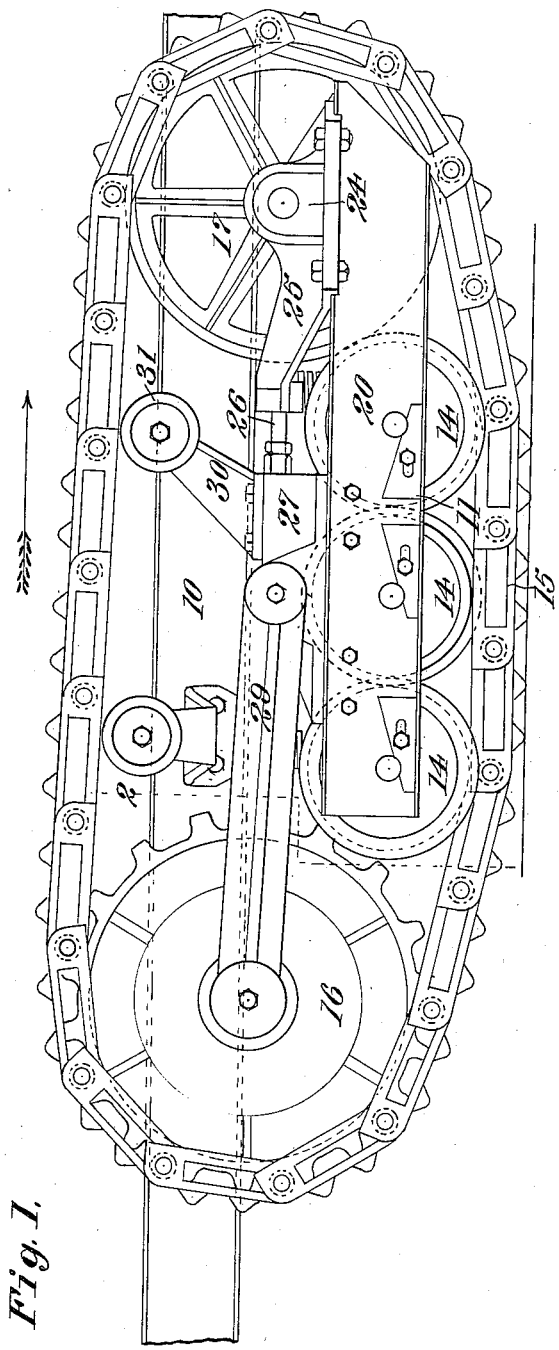
Figure 1 shows a side elevation of a tractor truck embodying my invention.
Figure 2:
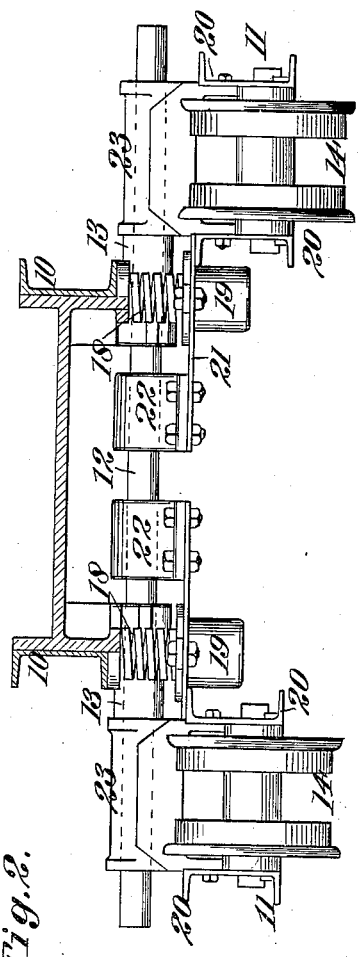
Fig. 2 shows a sectional view of the same taken on line 2—2.

In the drawings I show a main frame 10 of a tractor or other vehicle, supporting which is a roller truck frame 11 on each side pivoted intermediate its ends to a transverse shaft 12 carried in bearings 13 on the main frame. The roller truck frame is fitted with a series of rollers 14 bearing on the ground run of an endless chain track 15 running over a sprocket driving wheel 16 at the rear, said driving wheel being journaled upon the main frame, and an idler wheel 17 at the front journaled on the truck frame 11. A compressible coiled spring 18 is arranged between the truck frame and main frame at each side of the shaft 12, said springs having their seats in countersunk cups 19 on the roller truck frame which permits a spring of twice the usual length to be employed and consequently one of greater compressibility.

The construction of the roller truck frame includes longitudinally extending spaced channel bars 20 between which rollers 14 and idler wheels 17 are journaled and an inwardly extending plate 21 upon which the cups or sockets 19 for the springs are arranged. The connection between each roller truck frame and the shaft comprises a bearing box 22 at the inner end of the plate 21 and a bearing box 23 between the channel bars 20 connected thereto, said bearing boxes 22 and 23 being on opposite sides of the bearing member 13 which receives and supports the shaft on the main frame. As a result of this construction an extremely long bearing for the roller truck frame upon the shaft is provided as will be seen in Fig. 4 and consequently the roller truck frames are well supported against lateral deflection.

The idler wheel 17 has its bearings in blocks 24 formed upon the ends of a yoke 25 connected at the rear to an adjustable rod 26 which in turn is connected to a block 27 integral with the bearing 23 on the truck frame. The yoke 25 at its forward ends is connected to the channel bars 20 by means of bolts passing through elongated openings 28 whereby said yoke, by adjusting the rod 26, may be moved fore and aft to vary the position of the idler wheel relatively to the driving wheel so that the tension of the chain track may be kept approximately the same notwithstanding extension or contraction. A push bar 29 connects the axle of the driving wheel and the axle 12 together at the outer ends and forms a thrust connection which in operation maintains the driving wheel and roller truck frame in proper spaced relation. The block 27 also carries a standard 30 detachably connected thereto, on the upper end of which is a roller 31 supporting the upper run of the chain track.

In operation the roller truck frame is allowed a liberal amount of oscillating vertical movement, being unrestricted by the chain track notwithstanding the fact that it is pivoted to the main frame intermediate its ends and has an equal number of rollers disposed on opposite sides of its pivot. When, for instance, the front end of the roller truck frame moves upwardly a considerable amount of slack is produced in the chain which permits the rear end of the truck frame to move downwardly. When the rear end of the truck frame moves upwardly, while some slack is produced owing to the location of the rollers below the bottom plane of the sprocket driving wheel, such slack is not necessary to permit the front end of the roller truck frame to move downwardly, since the forwardly disposed rollers and the idler wheel move together and do not change their relative positions. By having the supporting roller 31 for the upper run of the track movable with the roller truck frame undue tightening of the chain does not occur when the front end of the truck frame and the idler wheel move downwardly and excessive slack is not produced when these parts move upwardly. The springs 18 cushion the rocking movements of the truck and maintain the same in the proper position for normal use. These springs it will be noted are the only connections between the ends of the roller truck frame and the main frame. The continuously extending transverse axle 12 keeps the opposite trucks in place and on account of the long bearings which the roller truck frames have therewith it effectually prevents lateral deflection of said trucks. The driving force when this mechanism is used in a self-propelled tractor is applied from the driving wheel 16 direct to the shaft 12 through the thrust bars 29 and thence to the front idler wheels through the yoke 25 and rod 26 which connections normally occupy a straight line position relative to each other. Thus the truck frames are relieved of any thrust or pulling strains.

Various changes in the construction and arrangement of the several parts herein shown and described may be employed without departing from the spirit of my invention as disclosed in the appended claims.

Having thus described my invention, what I claim and desire to secure by Letters Patent is:

1. In a vehicle, the combination with a main frame, of an endless flexible traction member, a truck within the traction member, a shaft on which the truck is fulcrumed intermediate its ends, a driving sprocket wheel for the traction member on the main frame and an idler wheel for said traction member journaled on the truck and rollers on said truck resting on the ground run of the traction member and equally disposed on opposite sides of the fulcrum point.

2. In a vehicle, the combination with a main frame, of an endless flexible traction member, a truck within the traction member, a shaft on which the truck is fulcrumed intermediate its ends, a driving sprocket wheel for the traction member on the main frame and an idler wheel for said traction member journaled on the truck and a spring interposed between the main frame and the truck adjacent each end of the latter.

3. In a vehicle, the combination with a main frame, of an endless flexible traction member, a truck within the traction member, a shaft on which the truck is fulcrumed intermediate its ends for rocking movement, said shaft having a bearing on the main frame intermediate its ends and bearings on said shaft for the truck arranged on opposite sides of the first mentioned bearing.

4. In a vehicle, the combination with a main frame, of an endless flexible traction member, a truck within the traction member, a shaft on which the truck is fulcrumed intermediate its ends, a driving sprocket wheel for the traction member on the main frame and an idler wheel for said traction member journaled on the truck and a thrust bar between said shaft and the axle of the driving sprocket wheel at the ends thereof.

5. In a vehicle, the combination with a main frame, of an endless flexible traction member, a truck within the traction member, a shaft on which the truck is fulcrumed intermediate its ends, a driving sprocket wheel for the traction member on the main frame and an idler wheel for said traction member journaled on the truck and a support for the upper run of the traction member carried by and movable with the truck.

6. In a vehicle, the combination with a main frame, of an endless flexible traction member, a truck within the traction member, said truck being fulcrumed between its ends on an unyielding part of the frame for vertical oscillating movement, both ends of said truck being free to move up or down, a drive sprocket wheel for the traction member mounted independently of the truck and an idler wheel for the traction member journaled upon the forward portion of the truck and movable therewith.

7. In a tractor, the combination with a main frame, of an endless flexible traction belt, a rear drive sprocket and a front idler both having the lower portions of their peripheries elevated normally above the ground and mutually supporting the opposite ends of said belt above the plane of its ground run, a load supporting truck within the belt between the sprocket and idler and pivoted on an axis fixed with relation to the main frame, said truck having a plurality of rollers in bearing engagement with the ground run of the belt and constituting the sole support for the main frame, a spring interposed between each end of the truck and the main frame, said springs being the only connections between the ends of the truck and the main frame.

8. In a tractor, the combination with a main frame, of an endless flexible traction belt, a rear driving sprocket wheel supporting the rear end of the traction belt, said sprocket wheel being mounted upon an axis fixed with relation to the main frame and having the lower portion of its periphery above the ground, thereby elevating the rear end of the traction belt above the plane of its ground run, a load supporting truck within the traction belt pivoted intermediate its ends on an axis fixed with relation to the main frame, said truck having a plurality of rollers in bearing engagement with the ground run of the belt, the rollers being equally disposed on opposite sides of the pivot, said rollers constituting the sole support for the main frame of the tractor, a spring connection interposed between each end of the truck and the main frame, said springs forming the only connections between the ends of the truck and the main frame and a front idler wheel supporting the forward end of the traction belt, said idler wheel being journaled on the forward end of the truck and also having the lower portion of its periphery normally elevated above the ground.

9. In a vehicle, the combination with a main frame, of an endless flexible traction member, a truck within the traction member, a shaft on which the truck is fulcrumed, said truck comprising longitudinally extending spaced channel bars fitted with rollers bearing upon the ground run of the traction member, a bearing box between the channel bars connected thereto and receiving said shaft, a laterally extending plate member connected to the inner channel bar and carrying at its end a bearing box also receiving said shaft, said shaft being supported on the main frame at a point intermediate said bearing boxes.

10. In a vehicle, the combination with a main frame, of an endless flexible traction member, a truck within the traction member, a shaft on which the truck is fulcrumed, said truck comprising longitudinally extending spaced channel bars fitted with rollers bearing upon the ground run of the traction member, a bearing box between the channel bars connected thereto and receiving said shaft, a laterally extending plate member connected to the inner channel bar and carrying at its end a bearing box also receiving said shaft, said shaft being supported on the main frame at a point intermediate said bearing boxes, springs arranged between the main frame and the truck at opposite sides of the shaft, said springs being seated in countersunk sockets on the inwardly extending plate member of the truck.

11. In a vehicle, the combination with a main frame, of an endless traction member, a truck within the traction member, a shaft on which the truck is fulcrumed, said truck comprising longitudinally extending spaced channel bars fitted with rollers bearing upon the ground run of the traction member, a bearing box between the channel bars connected thereto and receiving said shaft, a laterally extending plate member connected to the inner channel bar and carrying at its end a bearing box also receiving said shaft, said shaft being supported on the main frame at a point intermediate said bearing boxes, a rear driving wheel for the traction member journaled on the main frame, a thrust bar connection between the axle of said driving wheel and the outer end of said shaft and an idler wheel for the forward portion of the traction member journaled upon said truck between the forward ends of the channel bars.

In testimony whereof I have hereunto set my hand in the presence of two subscribing witnesses.

HAROLD C. WHITE.

Witnesses:
F. W. TARR,
E. O. BOQUIST.